United States Patent [15] 3,667,504
Wittren et al. [45] June 6, 1972

[54] ZERO-LEAKAGE SPOOL VALVE

[72] Inventors: Richard Arthur Wittren; Raymond Richard Meysenburg, both of Cedar Falls; Robert Hugh Tweedy, Brookfield, all of Wis.

[73] Assignee: Deere & Company, Moline, Ill.

[22] Filed: Dec. 28, 1970

[21] Appl. No.: 101,917

[52] U.S. Cl. .................................. 137/625.69, 251/DIG. 1
[51] Int. Cl. ......................................................... F16k 11/07
[58] Field of Search ................... 137/625.69, 625.25, DIG. 1; 251/172

[56] References Cited

UNITED STATES PATENTS

| 2,747,611 | 5/1956 | Hewitt | 137/625.69 |
| 2,506,111 | 5/1950 | Saint | 251/172 |
| 2,661,182 | 12/1953 | Kipp | 137/625.69 |
| 2,702,049 | 2/1955 | Seeloff | 137/625.69 |
| 2,713,989 | 7/1955 | Bryant | 251/DIG. 1 |
| 3,047,018 | 7/1962 | Lucien | 137/625.69 |

Primary Examiner—M. Cary Nelson
Assistant Examiner—Robert J. Miller
Attorney—H. Vincent Harsha, Harold M. Knoth, William A. Murray, John M. Nolan and Jimmie R. Oaks

[57] ABSTRACT

A plurality of O-ring packings are mounted between ports in a spool valve bore. A valve spool is selectively shiftable in the bore for routing fluid among the ports and includes a plurality of lands, each of which, when located between a pair of ports, is seatingly engaged by one of the packings for preventing leakage between the pair of ports. Under normal operating conditions, the fluid pressures respectively existing at the pair of ports are different and this pressure differential exists across the packing. In order to prevent the packing from being dislodged from its mounting groove by fluid pressure, when the land portion is moved past the packing, a passage means located in the valve spool connects the fluid pressure at the port, away from which the land portion is moving, to the side of the packing remote from the port, to balance the pressure on the opposite sides of the packing, when the land portion is just about to move past the packing.

13 Claims, 6 Drawing Figures

PATENTED JUN 6 1972 3,667,504

INVENTORS
R. A. WITTREN
R. R. MEYSENBURG
R. H. TWEEDY

INVENTORS
R. A. WITTREN
R. R. MEYSENBURG
R. H. TWEEDY

ZERO-LEAKAGE SPOOL VALVE

BACKGROUND OF THE INVENTION

The present invention relates to a spool valve and, more particularly, relates to a spool valve of the type wherein packing is used to prevent leakage across the valve spool lands.

Spool valves are of two general types. In the first type, metal-to-metal contact between the bore and the valve spool lands is relied upon to prevent leakage across the lands, and in the second type, packing is mounted on the lands to prevent leakage thereacross.

Heretofore, the first type of spool valves have been satisfactory in applications only where considerable valve leakage could be tolerated, and/or was otherwise compensated for by other valves in the system, or where operating pressures were very low. The reasons for these limitations are that valve member-to-bore tolerances have to be kept relatively large for free valve member motion unless considerable expense is gone to in polishing the surfaces of the bore and valve lands. Even then, the valve spools are apt to seize during operation due to temperature changes.

While the second type of spool valves can be manufactured at larger tolerances than the first type, current valves of the second type are also unsatisfactory except for low pressure use. This is because, at high pressures, it is difficult to maintain the packings, in their mounting grooves, due to pressure differentials existing thereacross which "blow out" the packings when the valve spool is shifted to meter flow past the lands.

SUMMARY OF THE INVENTION

According to the present invention there is provided a novel spool valve of the type wherein packings are used for preventing leakage across the lands of the valve spool.

It is a broad object of the invention to provide a spool valve, of the above-noted type, which is relatively inexpensive to manufacture and is reliable, even when the operating pressures are relatively high.

Another object is to provide such a spool valve wherein the pressure existing at the opposite sides of a packing is equalized at a position of the valve spool wherein a land is just about to move past the packing.

A more specific object is to provide a direction control valve, for a hydraulic cylinder, wherein a fluid passage in the valve spool relieves inlet fluid pressure from a packing and directs the relieved fluid to a work port to cause slow operation of the cylinder.

These and other objects will become apparent from the ensuing description and the appended drawings.

DESCRIPTION OF THE PREFERRED EMBODIMENT

Figure 1:
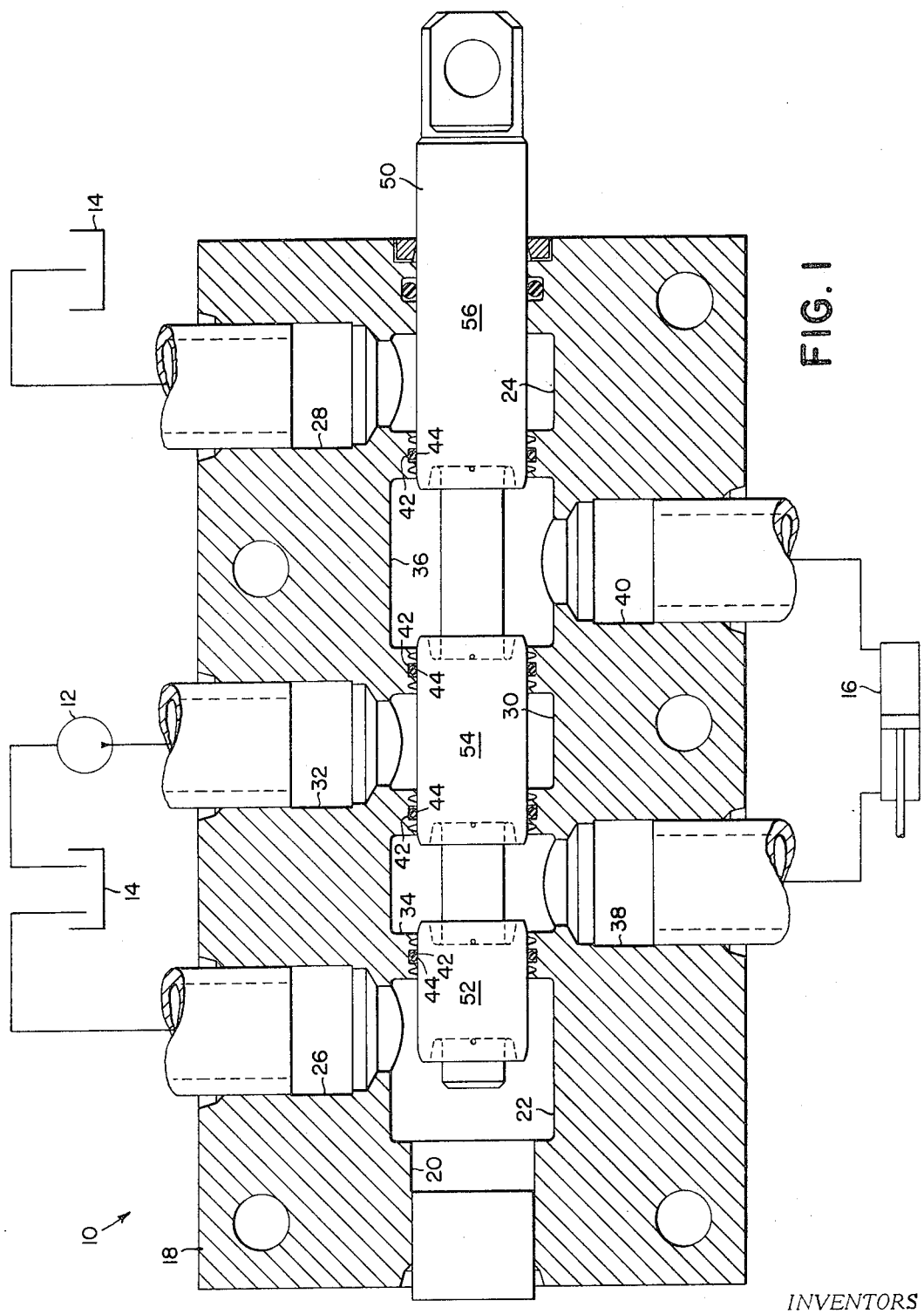
FIG. 1 is a view of a fluid system showing a spool valve, in longitudinal section; and schematically showing the remainder of the system.

Referring to the drawing, the improved spool valve is shown in the form of a direction control valve 10 for controlling the flow of fluid among a pump 12, a sump 14 and a double-acting hydraulic cylinder 16.

The valve 10 includes a body 18 in which there is a bore 20 having annular chambers 22 and 24, respectively adjacent its left and right ends, and to which are respectively connected a pair of sump-connected exhaust ports 26 and 28. Located approximately midway between the opposite ends of the bore 20 is an annular chamber 30 to which is connected a supply port 32, which, in turn, is connected to the output side of the pump 12. A pair of annular chambers 34 and 36 are respectively spaced axially leftwardly and rightwardly from the middle chamber 30. A pair of work ports 38 and 40 are respectively connected to the chambers 34 and 36 and are interconnected with the left and right ends of the cylinder 16.

A plurality of packing mounting grooves 42 are located one each between each pair of adjacent ports intersecting the bore 20, and an O-ring packing 44 is positioned in each of the grooves. As can best be seen in FIGS. 2–6, the packing 44 includes an elastomeric body 46, such as rubber or the like, to which is bonded a low-friction wear surface 48, such as Teflon.

Shown slidably mounted in the valve bore 20 is a valve spool 50 having axially spaced left, middle and right lands 52, 54 and 56, respectively. The valve spool 50 is illustrated in the "neutral" position wherein each of the ports connected to the bore is blocked from fluid communication with every other port and wherein the packings 44 are seated against associated ones of the lands 52, 54 and 56. Fluid pressure acting on the spool 50, at the diametral clearance between the spool 50 and the bore 20, is evenly distributed thereabout by a plurality of small, V-shaped balancing grooves 58, which are located one to each side of a packing 44.

Figure 2:
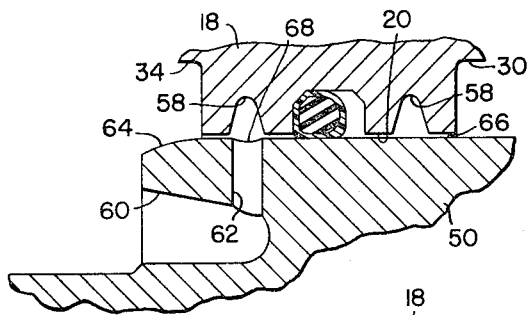
FIGS. 2–6 are enlarged, sectional views of the left end portion of one of the valve member lands, shown in FIG. 1, and the O-ring packing associated therewith and showing a sequence of axial positions of the land relative to the packing.
Figure 3:
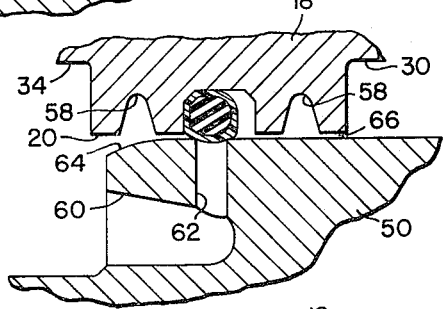
Figure 4:
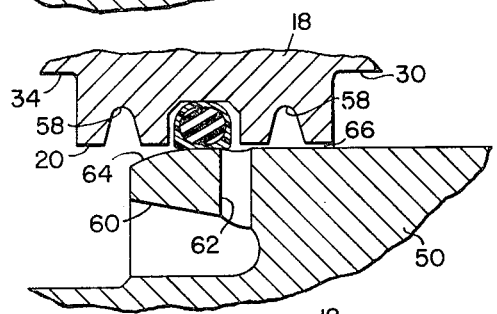

The spool 50 is selectively shiftable from the "neutral" position to three operative positions. Specifically, the spool 50 is shiftable to the left, right and extreme right from the "neutral" position to respective establish "raise", "lower" and "float" conditions in the cylinder 16. Applicants' invention is primarily concerned with keeping the packings 44 in their mounting grooves 42, when the lands 52, 54 and 56 are moved past the packings during selective positioning of the spool valve 50. For this purpose, the left and right ends of the lands 52 and 54, and the left end of the land 56, are each annularly undercut to form annular recesses 60. Four equi-annularly spaced bores 62 extend from the inner end of each of the recesses 60, radially outwardly through the lands. Also, it is to be noted that the ends of the lands 52, 54 and 56 all have a spherical entry chamfer 64. The purposes of the recesses 60, the bores 62 and the chamfers 64 are described with reference to FIGS. 2–6 wherein is shown a sequence of axial positions of the left end of the middle land 54 as it moves from the "neutral" position, across its associated packing 44, to the "lower" position. It is assumed, in FIGS. 2–6, that the fluid pressure at the supply port 32 is higher than that at the work port 38, however, the opposite can exist as well. Referring to FIG. 2, the land 54 is shown in the "neutral" position and the packing 44 is shown tightly sealed thereagainst to prevent leakage from the supply port 32 to the work port 38. The higher pressure at the supply port 32 urges the packing 44 against the left side of the groove 42, the passage of fluid to the packing being through a diametral clearance 66 between the land 54 and the bore 20. The bores 62 are in register with the balancing groove 58 to the left of the packing 44. In FIG. 3, the land 54 is shown moved slightly to the right to a position wherein the bores 62 are in register with, and are tightly sealed by, the packing 44. To prevent the bores from nibbling away the packing 44, their outer ends are chamfered and polished, as at 68. The land 54 is shown still further to the right in FIG. 4, in a position wherein the bores 62 are in register with the bore 20 at a location just to the right of the packing 44, which remains seated against the land 54. This balances the pressures acting on the packing 44, since both sides of the packing are now connected to the fluid pressure existing at the work port 38. Flow now passes from the supply port 32, through the clearance 66, to the bores 62 and then to the work port 38. The combined cross-sectional area of the bores 62 is enough greater than the cross-sectional area of the clearance 66 to easily bleed off any amount of fluid that will pass through the clearance under ordinary operating pressures. It is important at this juncture to note that the left end of land 56 will now occupy a similar position relative to its associated packing 44. Since the pressure at the work port 40 is higher than that at the exhaust port 28, fluid will flow from the work port 40, to the exhaust port 28 via the bores 62 and the clearance 66. It can thus be appreciated that a "slow lowering" condition exists in the cylinder 16 and that the speed of lowering is controlled by the amount of clearance 66.

Figure 5:
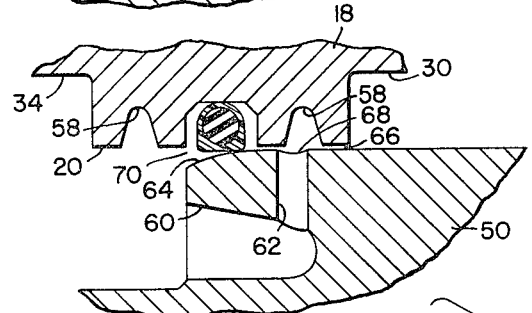
Figure 6:
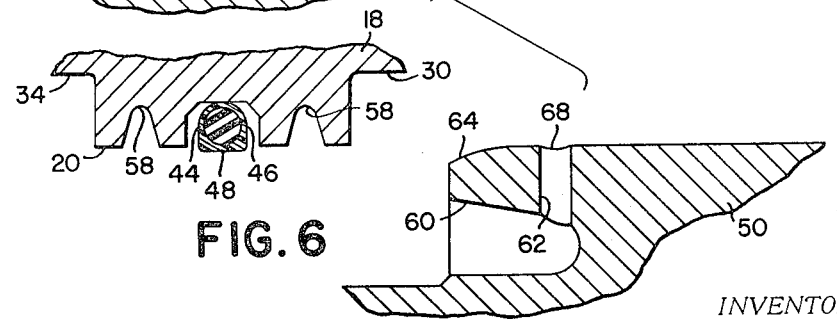

Referring now to FIG. 5, the land 54 is shown in a position wherein the packing 44 is in a free state, that is to say, it is no longer in seating engagement with the land 54. Since the pressure at the right side of the packing 44 has been relieved through the bores 62, there is no tendency toward the packing being blown out of the groove 42 through an opening 70 defined between the chamfered end 64 and the bore 20, as would be the case if the bores 62 were absent. The land 54 is shown in the "lower" position, in FIG. 6, wherein supply fluid is metered between the left end of the land 54 and the edge of the annular chamber 30.

When the spool 50 is returned to the "neutral" position, the above-described sequence of positions of the land 54 will of course be reversed. It is important to note that the chamfered end 64 of the land 54 will be the first portion thereof to engage the packing 44. It has been found that the spherical surface of the chamfer 64 is very helpful in reducing the amount of effort required to shift the spool among selected positions.

It is thought that the foregoing is a sufficient description of the operation of applicants' invention since every packing 44 is pressure-balanced by the bores 62, as above described, when an associated land is just about to reach an axial position wherein the packing is free.

We claim:

1. A zero-leakage spool valve comprising: a valve body defining a bore having a pair of axially spaced inlet and outlet ports; a valve spool reciprocally mounted in said bore and including a land, said valve spool being shiftable between first and second positions respectively wherein said land prevents flow between said inlet and outlet ports and wherein said land meters flow between said pair of ports; seal means for preventing leakage across said land when said valve spool is in said first position, said seal means including an annular groove in one of said bore and valve member and packing being located in said groove; passage means in the other of said bore and valve spool for connecting the fluid pressure at said inlet port to the side of the packing, which is remote from said inlet port, when the valve spool is in a position closely adjacent said second position; and said passage means including a plurality of annularly spaced, relatively small bores being in fluid communication with the interface between said valve spool and said bore.

2. The invention defined in claim 1 wherein said passage means has a cross-sectional area which is substantially larger than the cross-sectional area of the diametral clearance between said valve spool and said bore whereby the amount of fluid delivered by the passage means is controlled by the amount of clearance between the valve spool and said bore.

3. The invention defined in claim 1 wherein said plurality of bores have a combined cross-sectional area which is substantially larger than the cross-sectional area of the diametral clearance between said valve spool and said bore whereby the amount of fluid delivered by the bores is controlled by the amount of clearance between the valve spool and said bore.

4. The invention defined in claim 1 wherein said seal means is located in said bore and said passage means is located in said valve spool.

5. The invention defined in claim 4 wherein said passage means includes a plurality of radially extending, annularly spaced, relatively small bores intersected by an axially extending annular recess in the end of said land.

6. The invention defined in claim 5 wherein said plurality of bores have a combined cross-sectional area which is substantially larger than the cross-sectional area of the diametral clearance between said valve spool and said bore whereby the amount of fluid delivered by the bores is controlled by the amount of clearance between the valve spool and said bore.

7. The invention defined in claim 1 wherein the edge of the end of said land facing said outlet port is spherically chamfered.

8. A zero-leakage spool valve comprising: a valve body defining a bore having a pair of axially spaced ports respectively adapted for connection to a source of fluid pressure and a hydraulic function; a valve spool reciprocally mounted in said bore and including a land, said valve spool being shiftable between first and second positions respectively wherein said land prevents flow between said pair of ports and wherein said land portion meters flow between said pair of ports; seal means for preventing leakage across said land when said valve spool is in said first position, said seal means including an annular groove in one of said bore and land, and packing being located in said groove; passage means in the other of said bore and land for connecting the interface of the land and the bore, for connecting the fluid pressure at one of said ports to the side of the packing remote from said one port, when said valve member is in a third position axially adjacent said second position; said passage means including a plurality of annularly spaced, relatively small bores being in fluid communication with the interface between the valve spool and bore.

9. The invention defined in claim 8 wherein the radial clearance between said bore and valve member is such as to permit fluid flow from said inlet port at a rate sufficient to slowly operate said function when said valve member is in said third position and said passage means being large enough to convey flow at said rate.

10. The invention defined in claim 8 wherein said seal means is located in said bore and said passage means is located in said land.

11. The invention defined in claim 10 wherein said passage means includes a plurality of radially extending, annularly spaced, relatively small bores intersected by an axially extending annular recess in the end of said land.

12. The invention defined in claim 8 wherein the edge of the end of said land facing said one port is spherically chamfered.

13. A zero-leakage spool valve comprising: a valve body defining a bore having a pair of axially spaced inlet and outlet ports; a valve spool reciprocally mounted in said bore and including a land, said valve spool being shiftable between first and second positions respectively wherein said land blocks and meters flow between the inlet and outlet ports; seal means including an annular groove in said bore and packing being positioned in the groove; passage means for connecting the fluid pressure at said inlet port to the side of the packing remote from the inlet port when the valve spool is in a position closely adjacent said second position and said passage means extending first axially then radially in the land from that end closest to the inlet port to the radially outer surface of the land.

* * * * *